(12) United States Patent
Namatame

(10) Patent No.: US 8,249,648 B2
(45) Date of Patent: Aug. 21, 2012

(54) MOBILE TELECOMMUNICATION TERMINAL, COMMUNICATION SYSTEM, AND COMPUTER READABLE STORAGE MEDIUM

(75) Inventor: Shigeru Namatame, Tachikawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 856 days.

(21) Appl. No.: 12/237,010

(22) Filed: Sep. 24, 2008

(65) Prior Publication Data

US 2009/0082060 A1    Mar. 26, 2009

(30) Foreign Application Priority Data

Sep. 25, 2007   (JP) .................................. 2007-247845

(51) Int. Cl.
 *H04Q 7/20* (2006.01)
(52) U.S. Cl. ................... 455/552.1; 455/553.1; 455/416; 455/557; 455/414.1; 455/403; 370/310; 370/328; 370/329; 370/343
(58) Field of Classification Search ............... 455/552.1, 455/553.1, 557, 550.1, 551, 445, 422.1, 403, 455/458, 412.1, 412.2, 558, 426.1, 426.2, 455/416, 414.1–41.4; 370/310, 328, 329, 370/343
See application file for complete search history.

(56) References Cited

U.S. PATENT DOCUMENTS

| | | | | |
|---|---|---|---|---|
| 2004/0204092 | A1* | 10/2004 | Sato | 455/558 |
| 2005/0064853 | A1* | 3/2005 | Radpour | 455/414.4 |
| 2007/0032262 | A1 | 2/2007 | Namatame et al. | |
| 2007/0049343 | A1 | 3/2007 | Fukasawa | |
| 2007/0165798 | A1 | 7/2007 | Maehara | |
| 2007/0189502 | A1 | 8/2007 | Hidaka | |
| 2007/0201680 | A1 | 8/2007 | Hamada | |
| 2007/0201682 | A1 | 8/2007 | Niimi | |
| 2008/0058005 | A1* | 3/2008 | Zicker et al. | 455/552.1 |

FOREIGN PATENT DOCUMENTS

| | | |
|---|---|---|
| JP | 2003-339083 | 11/2003 |
| JP | 2004-193802 | 7/2004 |
| JP | 2004-289551 | 10/2004 |
| JP | 2005-210355 | 8/2005 |
| JP | 2006-067192 | 3/2006 |
| JP | 2007-013648 | 1/2007 |
| JP | 2007-221547 | 8/2007 |
| KR | 2006-0012218 | 2/2006 |

OTHER PUBLICATIONS

Korean Office Action dated Jan. 28, 2010 issued in the Korean counterpart and partial English translation of the Korean Office Action.

* cited by examiner

*Primary Examiner* — Keith Ferguson
(74) *Attorney, Agent, or Firm* — Cozen O'Connor

(57) ABSTRACT

Convenience is improved when a mobile telecommunication terminal uses a fixed telephone line. The mobile telecommunication terminal to perform communication via a mobile telecommunication network by cellular communication is a dual-mode terminal able to be wirelessly communicated (by non-cellular communication) with a communication device such as a fixed telephone or a wireless LAN (Local Area Network) access point. The mobile telecommunication terminal when carrying out signal transmission by accessing the communication device via a fixed telephone line connected to the communication device, obtains a telephone number of the mobile telecommunication using usable cellular communication as notifying information and transmits the information to the communication device. The communication device carries out signal transmission via the fixed telephone line so that the telephone number notified from the mobile telecommunication terminal is transmitted to a signal receiver.

10 Claims, 10 Drawing Sheets

| UIM1 | | UIM2 | | ... |
|---|---|---|---|---|
| TELEPHONE NUMBER | 090-**-1111 | TELEPHONE NUMBER | 090-**-2222 | ... |
| E-MAIL ADDRESS | 1111@*.ne.jp | E-MAIL ADDRESS | 2222@*.ne.jp | ... |
| ⋮ | ⋮ | ⋮ | ⋮ | |
| APPLICATION | BUSINESS | APPLICATION | PRIVATE | |

CELLULAR COMMUNICATION SETTING INFORMATION

| UIM3 | |
|---|---|
| TELEPHONE NUMBER (FIXED TELEPHONE) | 03-****-3333 |
| AUTHENTICATION INFORMATION (WIRELESS LAN) | [ESSID],[ENCRYPTION KEY], [MAC ADDRESS],··· |
| ⋮ | ⋮ |
| APPLICATION | BUSINESS |

NON-CELLULAR COMMUNICATION SETTING INFORMATION

| NAME | TELEPHONE NUMBER | ··· | ATTRIBUTE |
|---|---|---|---|
| A | 090-****-8888 | ··· | UIM1 |
| B | 090-****-9999 | ··· | UIM2 |
| C | 03-****-0000 | ··· | UIM3 |
| ⋮ | ⋮ | ⋮ | ⋮ |

ADDRESS INFORMATION

| TELEPHONE NUMBER | FMC LINE SETTING | ... |
|---|---|---|
| 03-****-3333 | FMC LINE | ... |
| 03-****-4444 | — | ... |
| 050-****-5555 | — | ... |
| ⋮ | ⋮ | ⋮ |

LINE INFORMATION

| IDENTIFICATION INFORMATION | | | | SECURITY INFORMATION | | |
|---|---|---|---|---|---|---|
| TELEPHONE NUMBER | IP ADDRESS | MAC ADDRESS | ... | ENCRYPTION KEY | ... | ... |
| 090-****-1111 | 192.168.*.111 | 11:::11:11:11 | ... | ******** | ... | ... |
| ⋮ | ⋮ | ⋮ | ⋮ | ⋮ | ⋮ | |

TERMINAL INFORMATION

MOBILE TELECOMMUNICATION TERMINAL, COMMUNICATION SYSTEM, AND COMPUTER READABLE STORAGE MEDIUM

BACKGROUND OF THE INVENTION

1. Field of the Invention

The present invention relates to a mobile telecommunication terminal, a communication system, and a computer readable storage medium and more particularly to the mobile telecommunication terminal, communication system and a computer readable storage medium that can be suitably used for performing communication through a fixed telephone line from the mobile telecommunication terminal and a computer readable storage medium to be used in the above terminal.

2. Description of the Related Art

As one of mobile telecommunication terminals such as a mobile telephone, a dual mode phone has been realized which has, in addition to a wireless communication function of connecting a mobile telecommunication terminal to a mobile telecommunication network (cellular network), a wireless communication function of another type (hereinafter referred to as a non-cellular communication function) such as a wireless LAN (Local Area Network), Bluetooth (Registered Trademark), or the like.

By using such a dual-mode phone, so-called FMC (Fixed Mobile Convergence) enabling a mobile telecommunication terminal to be adapted in communication performed through a fixed telephone network can be realized. The FMC allows a mobile telecommunication terminal to be connected, by a non-cellular communication function, to a communication device such as a wireless LAN access point being connected to a fixed telephone network or IP (Internet Protocol) telephone network and, therefore, a mobile telecommunication terminal can be used as a telephone connected to a fixed telephone network or as a child device of a fixed telephone.

As a result, the fixed telephone network can be used which generally provides low-priced communication service as compared with a mobile telecommunication network service and, therefore, in a communication environment accessible to a communication device connected to a fixed telephone network (for example, in a specified indoor place such as an office or home), a fixed telephone network is utilized by a non-cellular communication function and, in a communication environment inaccessible to a communication device, a cellular communication network is utilized by a cellular communication function, thus enabling the reduction of communication costs and improvement of convenience.

However, when a signal is transmitted using a fixed telephone network, a communication device to which the fixed telephone network is directly connected originates a call and, as a result, a number (telephone number) of a fixed telephone line housed in the communication device is notified as a telephone number of a signal transmitter to a signal receiver. That is, regardless of who possesses the mobile telecommunication terminal used in the signal submission, a telephone number being used by a company or family under contract with a carrier is notified to a signal receiver accordingly.

In communication between mobile telecommunication terminals through a cellular network, each of the mobile telecommunication terminals is notified of an individual telephone number and, as a result, by a link-up using an address directory function, a signal receiver can get information individually about who has originated the call. This is well known as one of the convenience properties to be obtained by using the mobile telecommunication terminal. This means that a telephone number of a mobile telecommunication terminal is not notified only when FMC service is used, which remarkably impairs the convenience of a mobile telecommunication terminal.

On the other hand, technology is disclosed in Unexamined Japanese Patent Application KOKAI Publication No. 2006-67192 in which, when an address directory function that a mobile telecommunication terminal has is used on a fixed telephone by the technology to establish a link between a mobile telecommunication terminal and a fixed telephone, a telephone number is not notified to a person on the other end of the phone. However, the conventional technology is to make the number of a fixed telephone not to be notified and is not technology to enable the notification of the number of a mobile telecommunication terminal. Moreover, Unexamined Japanese Patent Application KOKAI Publication No. 2006-67192 is included in the specification of the present invention.

SUMMARY OF THE INVENTION

In view of the above, it is an object of the present invention to provide a mobile telecommunication terminal and communication system capable of notifying a number of a mobile telecommunication terminal even when a fixed telephone network is used by the mobile telecommunication terminal and a storage medium to be used in the above terminal and system.

In order to achieve the above object, according to the first aspect of the present invention, there is provided a mobile telecommunication terminal for performing mobile telecommunication by wireless access to a mobile telecommunication line and wireless communication using a communication method being different from the wireless access, including:

a communicability determining section which determines whether or not communication is made possible, by the wireless communication, with a communication device to which a non-mobile telecommunication line being different from the mobile telecommunication line is connected; and a signal transmission instructing section which, when it is determined by the communicability determining section that communication with a communication device by the wireless communication is made possible, accesses wirelessly the communication device and instructs the communication device to carry out signal transmission enabling the identification of the mobile telecommunication terminal through the non-mobile telecommunication line.

According to the present invention, identifying information of a mobile telecommunication terminal is allowed to be notified to a signal receiver, when communication is performed from the mobile telecommunication terminal through a fixed telephone line.

BRIEF DESCRIPTION OF THE DRAWINGS

These objects and other objects and advantages of the present invention will become more apparent upon reading of the following detailed description and the accompanying drawings in which:

FIG. 3A shows an example of cellular communication setting information to be stored in a cellular communication setting information storing region, FIG. 3B shows an example of non-cellular communication setting information to be stored in a non-cellular communication setting information storing region;

FIG. 3C shows an example of address information to be stored in an address information storing region;

DETAILED DESCRIPTION OF THE PREFERRED EMBODIMENTS

Figure 1:
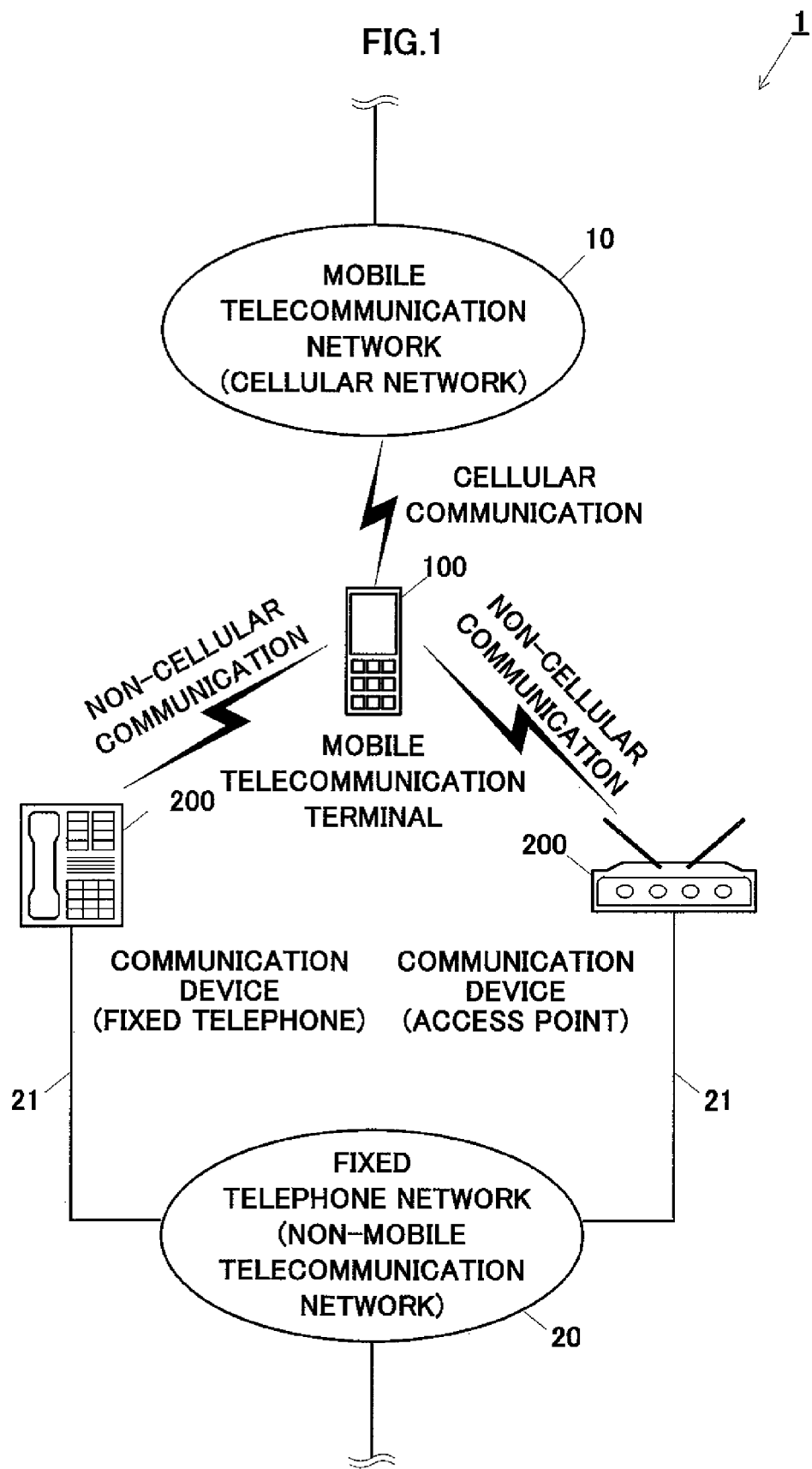
FIG. 1 is a diagram showing a configuration of a communication system according to an embodiment of the present invention.

Hereinafter, the embodiments of the present invention will be described by referring drawings. First, the communication system of the embodiments of the present invention is explained by referring to drawings. FIG. 1 is a diagram schematically showing a configuration of the communication system 1 of the embodiment of the present invention.

The communication system 1, as shown in FIG. 1, is made up of a mobile telecommunication terminal 100 and a communication device 200. Moreover, the communication system 1 includes a mobile telecommunication network (cellular network) 10 to perform mobile telecommunication (so called cellular communication) using the mobile telecommunication terminal 100 and a fixed telephone network 20 (non-mobile telecommunication network) by which the communication device performs fixed telephone communication.

The mobile telecommunication terminal 100 is so configured as to be accessible wirelessly to the mobile telecommunication network 10 and communication device 200. The mobile telecommunication terminal 100 can realize so-called FMC (Fixed Mobile Convergence) service that enables communication performed through the fixed telephone network 20 by accessing to the communication device 200.

The mobile telecommunication network 10 is a cellular network provided by a mobile telecommunication carrier which includes a wireless access network, core network, or the like. Here, the wireless access network is made up of a plurality of wireless base stations to be accessed wirelessly by the mobile telecommunication terminal 100, a plurality of RNCs (Radio Network Controllers) that control a plurality of the wireless base stations, or the like. Moreover, the core network includes a transit exchange to connect the plurality of RNCs, a gateway exchange used to connect to another communication network, a home memory to store location information of the mobile telecommunication terminal, or the like. The mobile telecommunication terminal 100 establishes a mobile telecommunication line by wirelessly accessing the mobile telecommunication network 10 to perform mobile telecommunication.

The fixed telephone network 20 is a communication network (non-mobile telecommunication network) to implement a general subscriber telephone or IP telephone using a non-mobile telecommunication terminal such as a fixed telephone, or the like and is made up of a telephone line network of a line-exchange type or a communication network of a packet exchange type to perform IP (Internet Protocol) communication or the like. Examples of the telephone line network of the line exchange type include a PSIN (Public Switched Telephone Network), ISDN (Integrated Services Digital Network), or the like. Incidentally, examples of the communication network of the packet exchange type include an optical fiber network, DSL (Digital Subscriber Line), or the like. The fixed telephone network 20 is connected to the communication device 200 by the fixed telephone line 21 (non-mobile telecommunication line) serving as an access line. As a result, the mobile telecommunication terminal 100 of the embodiment, by using the FMC technology, can perform communication (non-mobile telecommunication) through the fixed telephone line 21 connected to the communication device 200.

Next, the mobile telecommunication terminal 100 of the embodiment will be described. The mobile telecommunication terminal 100 is used to perform mobile telecommunication using so-called cellular communication employed, for example, in a mobile phone, PHS (Personal Handyphone System), or the like. The mobile telecommunication terminal 100 serves as a so-called dual-mode phone which has, besides a communication function, as a basic function, such as voice communication or data communication performed through the mobile telecommunication network 10 (hereinafter "cellular communication function"), a wireless communication function (hereinafter "non-cellular communication function") of another type being different from that of the cellular communication such as a wireless LAN (Local Area Network), Bluetooth (Registered Trademark), or the like.

Figure 2:
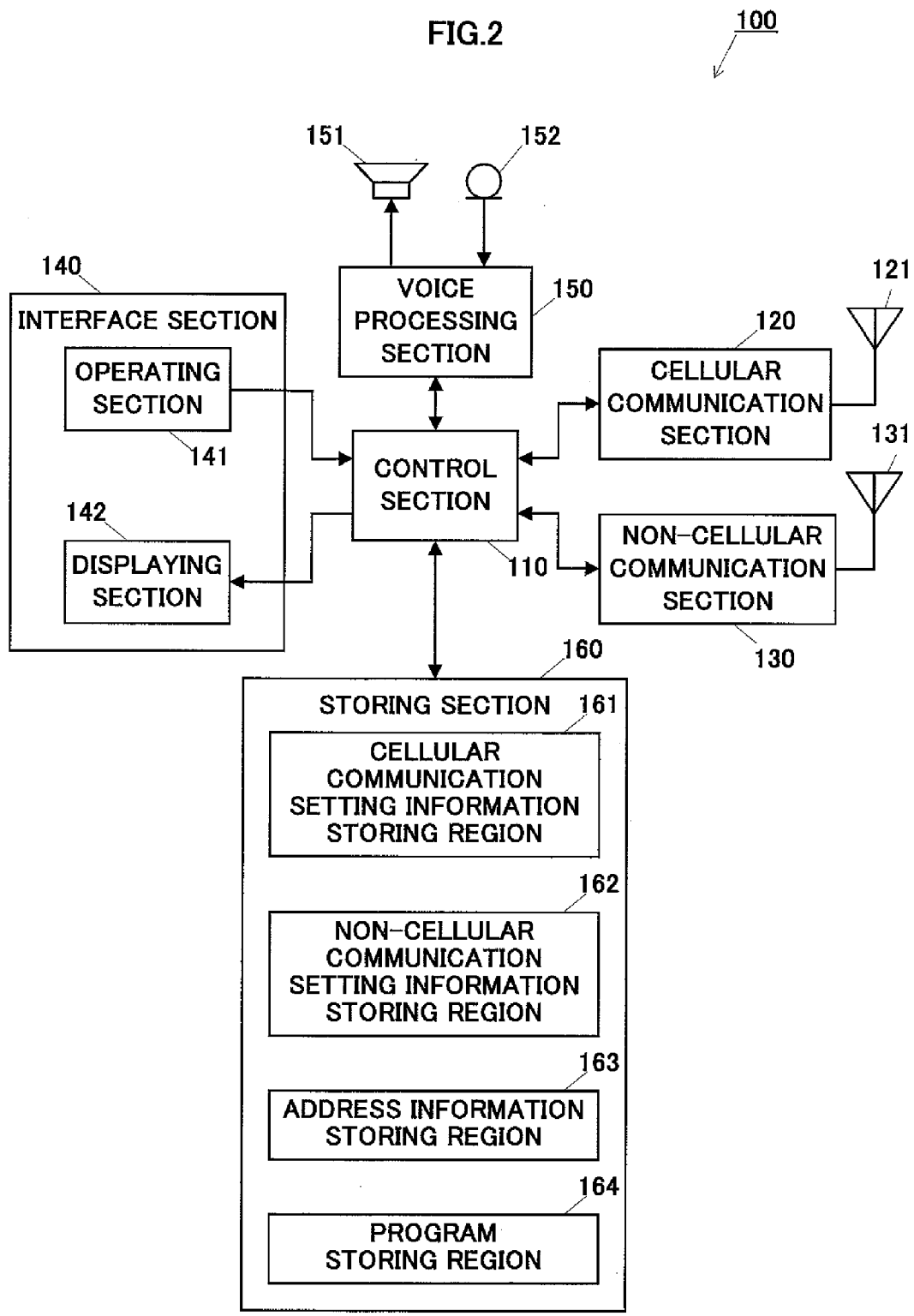
FIG. 2 is a block diagram showing configurations of a mobile telecommunication terminal shown in FIG. 1.

Configurations of the mobile telecommunication terminal 100 described as above will be explained by referring to drawings. FIG. 2 is a block diagram showing configurations of the mobile telecommunication terminal 100. The mobile telecommunication terminal 100, as shown in FIG. 2, includes a control section 110, a cellular communication section 120, a non-cellular communication section 130, an interface section 140, a voice processing section 150, and a storing section 160, or the like.

The control section 110 is made up of, for example, a CPU (Central Processing Unit), RAM (Random Access Memory) serving as a working area, or the like and executes a specified operation program to control each component of the mobile telecommunication terminal 100. That is, each component of the mobile telecommunication terminal 100 is controlled by the control section 110 and the transmission of information among components is carried out via the control section 110.

The cellular communication section 120 is used to perform a cellular communication operation using the mobile telecommunication terminal 100 and is made up of communication devices using, for example, a CDMA (Code Division Multiple Access) method or the like. The cellular communication section 120 performs wireless communication with a neighboring base station by carrying out wireless transmission and reception using an antenna 121 corresponding to the communication method employed presently. By being configured as above, the mobile telecommunication terminal 100 can realize wireless access to the mobile telecommunication network 10 by using the cellular communication section 120.

The non-cellular communication section 130 is used to perform a non-cellular communication operation by the mobile telecommunication terminal 100 and is made up of wireless communication devices designed in conformity with a short-distance wireless communication such as a wireless LAN standard of a type of the IEEE (Institute of Electrical and Electronics Engineers) 802.11, Bluetooth, or the like. The non-cellular communication section 130 can perform wireless communication with a device corresponding to the wireless communication method by carrying out wireless transmission and reception using an antenna 131 corresponding to the communication standard employed presently. In the embodiment, the communication device 200 corresponds to the wireless communication method of the non-cellular communication section 130. Owing to this, the mobile telecommunication terminal 100 can perform wireless communication with the communication device 200 by the operation of the non-cellular communication section 130.

The interface section 140 performs interfacing between the mobile telecommunication terminal 100 and its user and is made up of, for example, an operating section 141, a displaying section 142, or the like.

The operating section 141 is constituted of buttons or keys mounted on a surface of the mobile telecommunication terminal 100 and operated by a user of the mobile telecommunication terminal 100. The operating section 141 has input circuits connected to each button or each key to generate an input signal according to operations of a user and inputs the generated signal to the control section 110.

The displaying section 142 is a display output device made up of, for example, a liquid crystal display device and displays an image or the like according to control of the control section 110.

The voice processing section 150 is made up of, for example, codec circuits for voice data or the like and performs processing of voice inputting, voice outputting of the mobile telecommunication terminal 100. More specifically, the voice processing section 150 converts digital voice data received by the cellular communication section 120 or the non-cellular communication section 130 into an analog voice signal and performs a speech receiving operation of outputting the converted signal. Moreover, the voice processing section 150 converts a speech voice of a user inputted from the microphone 152 into digital voice data and performs a speech transmitting operation of outputting the converted data to the cellular communication section 120 or the non-cellular communication section 130.

The storing section 160 is made up of, for example, storing devices such as a flash memory to store an operating program to be executed by the control section 110 and further various data required to achieve the present invention. The storing section 160, as shown in FIG. 2, includes a cellular communication setting information storing region 161, a non-cellular communication setting information storing region 162, an address information storing region 163, a program storing region 164, or the like which all serve as storing regions.

The cellular communication setting information storing region 161 is a storing region to store setting information (cellular communication setting information) required when the mobile telecommunication terminal 100 performs cellular communication. More specifically, in the cellular communication setting information storing region 161 are stored identification information or various authentication keys such as a unique telephone number or a unique e-mail address assigned to every mobile telecommunication terminal under contract with the mobile telecommunication carrier, or the like.

The setting information of cellular communication described above can be provided by so-called UIM (User Identity Modular) card in which information about a subscriber according to the contract with the communication carrier is stored. That is, the cellular communication setting information storing region 161 may be located in the storing section 160 or on the storing element of the UIM card to be attached additionally to the mobile telecommunication terminal 100.

According to the embodiments, in the cellular communication setting information storing region 161 of the storing section 160, one piece of setting information has been, in advance, stored as default information and information stored in the UIM card attached to the mobile telecommunication terminal 100 is read and stored therein.

Here, the mobile telecommunication terminal 100 is configured so that at least one or more UIM cards (two or more in the embodiment) described above can be installed. That is, the mobile telecommunication terminal 100 is a dual mode phone which allows one mobile telecommunication to selectively use two or more telephone numbers or the like. Thus, in the dual-mode phone, two or more telephone numbers can be selectively used properly, for example, one for business use and another for private use. In the embodiments, the mobile telecommunication terminal 100 can be used mainly for business purpose, for example, according to a corporation contract. Therefore, in the cellular communication setting information storing region 161, a telephone number or the like for business use (for example, a telephone number or the like to be used for communication with a customer, business partner, or the like) is stored as default information. On the other hand, setting information for a telephone number for private use (telephone numbers to be used for communication with, for example, a family or friend) is stored in the UIM card. A user is allowed to properly use one mobile telecommunication terminal 100 both for business use and for private use by installing the UIM card in the mobile telecommunication terminal 100.

The non-cellular communication setting information storing region 162 is a storing region to store setting information (non-cellular communication setting information) required for non-cellular communication performed with the communication device 200. In the embodiments, the setting information based on the contract for use of the FMC is stored in the non-cellular communication setting information storing region 162. Therefore, the mobile telecommunication terminal 100, when an FMC use contract for business application by a corporation contract, by its user's communicating with the communication device 200 installed in a structure of an enterprise to which its user belongs, realizes the FMC using a fixed telephone line with which the enterprise has signed the contract.

In the non-cellular communication setting information storing region 162 is stored the setting information to be assigned according to the FMC use contract described above. More specifically, in the non-cellular communication setting information storing region 162 are stored, for example, a telephone number of a fixed telephone line 21 allowed to be used according to the FMC contract or the like, besides information about various kinds of authentication required for communication with the communication device 200. Moreover, the setting information assigned according to the FMC contract can be also provided by the UIM card. Therefore, the non-cellular communication setting information storing region 162, as in the case of the cellular communication setting information storing region 161, may be mounted on a storage element of the UIM card attached to the mobile telecommunication terminal 100.

In the embodiments, the non-cellular communication setting information storing region 162 is mounted on the storage element of the UIM card placed on the mobile telecommunication terminal 100 or the like. That is, to the mobile telecommunication terminal 100 are mounted the UIM card for cellular communication (for private use) and the UIM card for non-cellular communication. This allows the mobile telecommunication terminal 100 to use three telephone numbers (two for cellular communication use and one for non-cellular communication use).

FIGS. 3A to 3C are diagrams showing an example of information stored in the cellular communication setting information storing region 161 and non-cellular communication setting information storing region 162. FIG. 3A shows an example of information stored in the cellular communication setting information storing region 161 and FIG. 3B shows an example of information stored in the non-cellular communication setting information storing region 162.

In the cellular communication setting information storing region 161 are stored, as shown in FIG. 3A, cellular communication setting information for business application registered as default information and cellular communication setting information for private application read from the UIM card. Each setting information contains information about application corresponding to application purpose, besides a telephone number or e-mail address to be employed for each setting.

Hereinafter, the cellular communication setting information for business application registered as default information in the cellular communication setting information storing region 161 is referred to as "UIM1" and the cellular communication setting information for private application read from the UIM card is referred to as "UIM2". In this case, in the cellular communication setting information storing region 161, as shown in FIG. 3A, "business" is stored as an application for UIM1 and "private" is stored as an application for UIM2. Such information showing applications is arbitrarily set by, for example, a user of the mobile telecommunication terminal 100.

In the non-cellular communication setting information storing region 162 are, as shown in FIG. 3B, stored authentication information required for communication with the communication device 200, and made usable according to the FMC contract, a telephone number of a fixed telephone line 21 (hereinafter simply "FMC line") being usable for the FMC service by using the communication device 200, an application in which the telephone number is used. Hereinafter, the non-cellular communication setting information set in the non-cellular communication setting information storing region 162 is referred to as "UIM3". As described above, for the mobile telecommunication terminal 100 of the embodiment, the FMC contract for business application is signed. Therefore, in the non-cellular communication setting information storing region 162, as shown in FIG. 3B, as the application for the UIM3, "business" is stored. Thus, information showing the application of the non-cellular communication is set, for example, by a provider of the FMC service at a time of signing of the FMC contract.

The address information storing region 163 shown in FIG. 2 is a region where address information required for realizing the address directory function (telephone directory function) of the mobile telecommunication terminal 100. In the embodiments, in the address information storing region 163, address information is registered in a manner to correspond to each of the telephone numbers or the like being usable in the mobile telecommunication terminal 100.

FIG. 3C is a diagram showing an example of address information stored in the address information storing region 163. In the address information storing region 163 are stored, as shown in FIG. 3C, attribute information of each address information, besides general address information such as a name or telephone number, e-mail address or the like of a partner on the other end of the phone. In the embodiments, in the address information storing region 163, attribute information (for example, UIM1, UIM2, UIM3 as described above) showing communication being usable in the mobile telecommunication terminal 100.

Incidentally, in the address information storing region 163, a communication type to be used is set depending on which telephone number is requested to be notified to a registered party to be communicated with. For a party to be communicated with (for example, a person "A" in FIG. 3C) to whom a telephone number for the mobile telecommunication corresponding to the cellular communication setting of the UIM1 is desired to be notified, the attribute "UIM1" is registered. Moreover, for a party to be communicated with (for example, a person "B" in FIG. 3C) to whom a telephone number for the mobile telecommunication corresponding to the cellular communication setting of UIM2 is desired to be notified, the attribute "UIM2" is registered. Moreover, in the case where the FMC service can be used, for a party to be communicated with (for example, a person "C" in FIG. 3C) to whom a telephone number of a fixed telephone line 21 to be used for the FMC service is to be notified, the attribute "UIM3" is registered.

In the case where the UIM card is used, in the address information storing region 163 is stored address information corresponding to the UIM card. This causes the address information corresponding to the UIM card that has been used, up to this time, in the mobile telecommunication terminal 100 to be stored in the address information storing region 163 and, therefore, an unspecified change of the usable telephone number or the like caused by insertion or withdrawal of the UIM card can be prevented. Moreover, if there is limitation, for reasons for security, so that address information corresponding to the UIM card is stored only in the UIM card, the address information may be directly read out from the UIM card mounted on the mobile telecommunication terminal 100 by using the UIM card as part of the address information storing region 163.

The program storing region 164 is a region where a program to be executed by the control section 110 is stored. In the program storing region are stored an OS (Operating System) to control an entire operation of the mobile telecommunication terminal 100, application software to achieve various functions of the mobile telecommunication terminal 100, or the like. The control section 110 can realize configurations required to perform processing of the embodiment of the present invention by executing the program stored in the program storing region 164.

Figure 4:
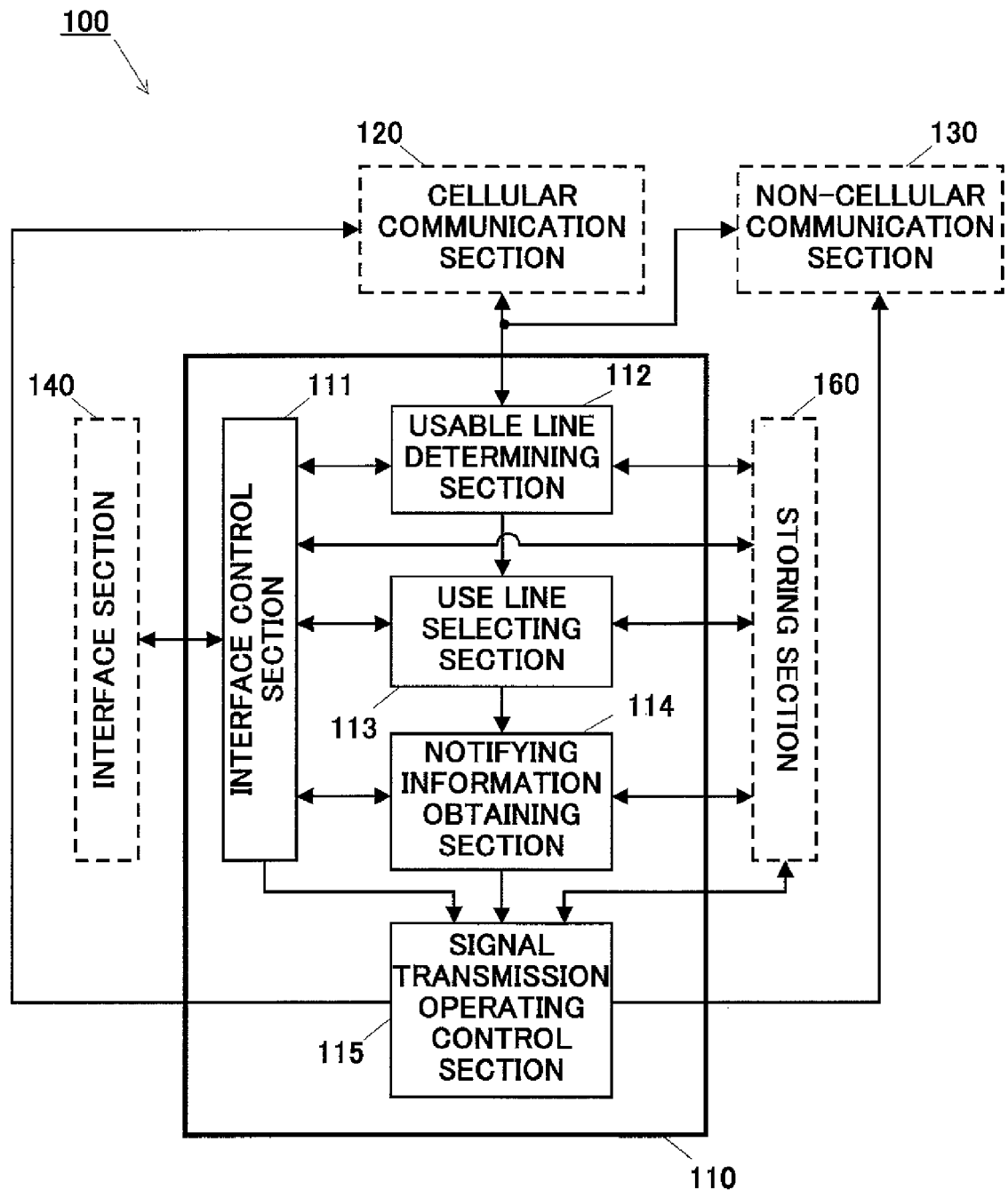
FIG. 4 is a functional block diagram showing functions realized by a control section shown in FIG. 2.

More specifically, when the mobile telecommunication terminal 100 performs an operation of signal transmission, the control section 110 executes the program stored in the program storing region 164 to realize functions as shown in the functional block diagram in FIG. 4. The control section 110, as shown in FIG. 4, has such functional sections as an interface control section 111, a usable line determining section 112, a use line selecting section 113, notifying information obtaining section 114, and signal transmission operating control section 115, or the like.

The interface control section 111 controls the interface section 140 and receives an input signal transmitted from the operating section 141 and generates and output various images to the displaying section 142.

The usable line determining section 112 controls the cellular communication section 120 and the non-cellular communication section 130 to determine the line that can be used by the mobile telecommunication terminal 100. More specifically, the usable line determining section 112 determines whether or not the cellular communication and non-cellular communication is usable by monitoring operations of the cellular communication section 120 and non-cellular communication section 130. More in detail, the usable line determining section 112 determines whether or not the mobile telecommunication terminal 100 is within a communication zone by monitoring to see whether or not the cellular communication section 120 is communicable with a neighboring wireless base station. Also, the usable line determining section 112 determines whether or not the mobile telecommunication terminal 100 is within a communication zone of the communication device 200 by monitoring to see whether or not the non-cellular communication section 130 is communicable with the communication device 200.

Also, the usable line determining section 112 determines whether or not the line to be used for communication with a party on the other end of the phone who is desired by a user of the mobile telecommunication terminal 100 is usable based on an input signal from the operating section 141.

The use line selecting section 113 selects a line to be used based on the determining result obtained by the usable line determining section 112 and an input signal from the operating section 141.

The notifying information obtaining section 114 obtains a telephone number (notification number) or the like to be notified at a time of signal transmission from the mobile telecommunication terminal 100 from the cellular communication setting information storing region 161 or non-cellular communication setting information storing region 162 based on the line selected by the use line selecting section 113 and the input signal from the operating section 141.

The signal transmission operating control section 115 controls the cellular communication section 120 or non-cellular communication section 130 according to the line selected by the use line selecting section 113 to performs signal transmission operations. Here, when a signal is transmitted by cellular communication, the signal transmission operating control section 115 controls the cellular communication section 120 so that notifying information obtained by the notifying information obtaining section 114 is notified to a party on the other end of the phone. On the other hand, when a signal is transmitted by non-cellular communication, the signal transmission operating control section 115 controls the non-cellular communication section 130 so that notifying information obtained by the notifying information obtaining section 114 is notified to the party on the other end of the phone. In this case, the signal transmission operating control section 115 generates a control signal to control the operation of the communication device 200 and transmits the generated signal from the non-cellular communication section 130 to the communication device 200.

In the embodiments, each function shown in FIG. 4 can be logically implemented by the execution of programs by the control section 110, however, each function described above may be implemented by hardware such as an ASIC (Application Specific Integrated Circuit).

Moreover, each function described above is an element required to make the mobile telecommunication terminal 100 function as the mobile telecommunication terminal of the present invention; therefore, other functions related to the basic and additional functions may be provided as necessary.

Next, the communication device 200 is explained. As described above, the communication device 200 is, for example, a fixed telephone connected to the fixed telephone line 21 or a wireless communication access point connected to the fixed telephone line 21. In the embodiment, the communication device 200 serves as a mediated communication device between the mobile telecommunication terminal 100 and fixed telephone network 20 by performing wireless communication with the mobile telecommunication terminal 100.

As described above, according to the embodiments, the FMC is implemented by the mobile telecommunication terminal 100 and the communication device 200. Therefore, when the FMC service is used in, for example, a general family, a fixed telephone which can use the mobile telecommunication terminal 100 as its child device by wireless communication (for example, wireless communication according to the Bluetooth) is used as the communication device 200. Also, when the FMC service is used in an office, the wireless LAN access point connected to a LAN constructed in the office is used as the communication device 200. Moreover, the combination of the use place of the FMC and communication device 200 is arbitrary and is not limited to the above example.

Figure 5:
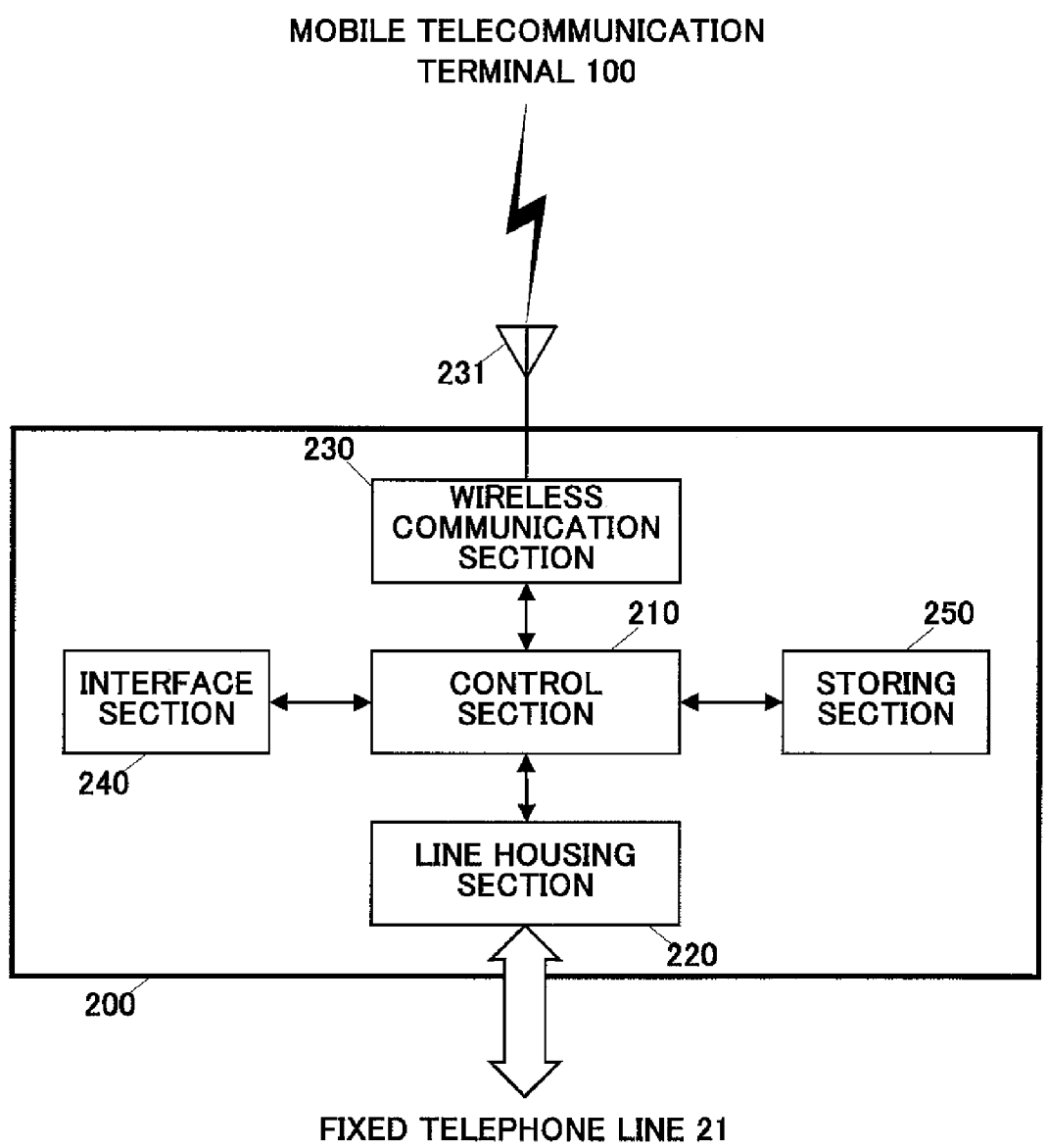
FIG. 5 is a block diagram showing configurations of a communication device shown in FIG. 1.

Configurations of the communication device 200 are described by referring to drawings. FIG. 5 is a block diagram showing configurations of the communication device 200. The communication device 200, as shown in FIG. 5, includes a control section 210, a line housing section 220, a wireless communication section 230, an interface section 240, and a storing section 250.

The control section 210 is made up of a CPU, RAM, or the like serving as a working area and controls each component of the communication device 200 by executing a specified operation program. That is, each component of the communication device 200 is controlled by the control section 210 wherein information transmission among components is performed via the control section 210.

The line housing section 220 houses a fixed telephone line 21 used to connect the fixed telephone network 20 wherein communication is performed by using the fixed telephone line 21 via the fixed telephone network 20. Incidentally, so long as at least one fixed telephone line 21 for a telephone number being used under FMC contract is housed in the line housing section 220, a plurality of lines may be housed therein.

Also, the line housing section 220 is made up of components applied to a known communication device being used for the FMC structure. Even in the case where an access via the IP (Internet Protocol) network is required when executed to satisfy specifications of FMC to be employed, the FMC can be implemented only if an access line to a communication network other than a fixed telephone network is housed in the line housing section 220. Also, between the line housing section 220 and communication network including the fixed telephone line 21 or fixed telephone network 20 exists, if necessary, a communication device (for example, modem, router, PBX (Private Branch Exchanger), gateway device, circuit terminating device, or the like) corresponding to the line or communication network.

The wireless communication section 230 is a wireless communication device used to enable the non-cellular communication with the mobile telecommunication terminal 100. Therefore, the wireless communication section 230 is made up of the wireless communication device corresponding to the communication method being employed in the non-cellular communication between the mobile telecommunication terminal 100 and communication device 200. The wireless communication section 230 performs wireless communication with the mobile telecommunication terminal 100 by controlling the transmission and reception of wireless waves using an antenna 231 operating according to the wireless communication method.

The interface section 240 serves as an interface between the communication device 200 and its user so that the setting and/or control of the communication device 200 can be done. In the case where a fixed telephone is employed as the communication device 200, a handset and/or dial button or the like are included in the interface section 240. Also, in the case where the wireless LAN access point is employed as the communication device 220, in addition to an indicator, switch, or the like, components used to establish connection with an external device (such as a personal computer) via the LAN is included in the interface section 240.

Figures 6A, 6B, 6C:
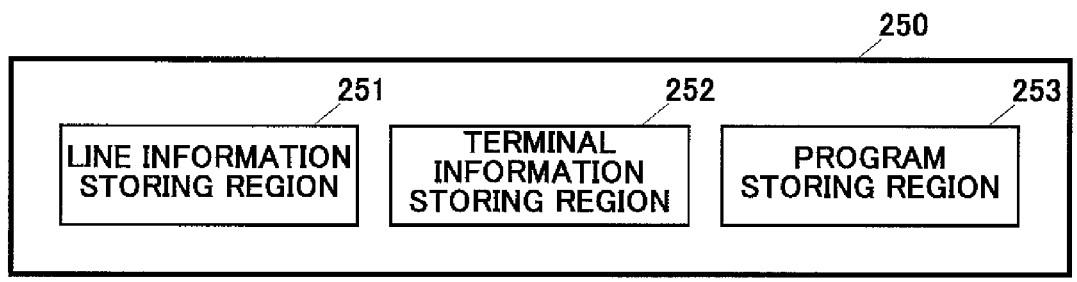
FIG. 6A shows a storing region making up the storing section.
FIG. 6B shows an example of line information to be stored in a line information storing region shown in FIG. 6A.
FIG. 6C shows an example of terminal information to be stored in a terminal information storing region shown in FIG. 6A.

The storing section 250 is made up of storage devices such as a flash memory or the like and stores not only operation programs to be executed by the control section 210 but also various data required to achieve the present invention. According to the embodiment, the storing section 250 has storing regions as shown in FIG. 6A. In each of the storing regions is stored specified information. The storing section 250 is made up of storing regions such as a line information storing region 251, a terminal information storing region 252, and a program storing region 253 as shown in FIG. 6A.

The line information storing region 251 is a region where information (line information) about the fixed telephone line 21 housed in the line housing section 220 is to be stored. FIG. 6B is a diagram showing an example of information to be stored in the line information storing region 251. In the line information storing region 251, as shown in FIG. 6B, not only a telephone number of the fixed telephone line 21 being housed therein but also information showing which line is a line used for the FMC (FMC line) is stored. Such line information is stored in the line information storing region 251 by operations via the interface section 240 and is set by a communication carrier providing the housed line, carrier providing FMC service, user of the communication device 200, or the like.

The terminal information storing region 252 is a region where information about the mobile telecommunication terminal 100 (terminal information) that provides the FMC service by using the communication device 200 is stored. FIG. 6C is a diagram showing an example of information to be stored in the terminal information storing region 252. In the terminal information storing region 252 are stored, as shown in FIG. 6C, identification information about the mobile telecommunication terminal 100 that enables the access to the communication device 200 and the use of the FMC (for example, unique identification information such as a telephone number, IP address, MAC (Media Access Control) address assigned to the mobile telecommunication 100), information about security needed at a time of communication with the mobile telecommunication terminal 100 (for example, encryption key), a telephone number of a line that the mobile telecommunication terminal 100 can utilize for providing the FMC service, or the like. Such terminal information is stored in the terminal information storing region 252 by operations via the interface section 240 and is set by, for example, a carrier that provides the FMC service, a user of the communication device 200, or the like.

The program storing region 253 is a region where a program to be executed by the control section 210 is stored. In the program storing region 253 are stored an OS to control the entire communication device 200, and/or program used to realize various functions of the communication device 200. The control section 210 can implement configurations required to perform processing of the embodiment by executing the program stored in the program storing region 253.

Figure 7:
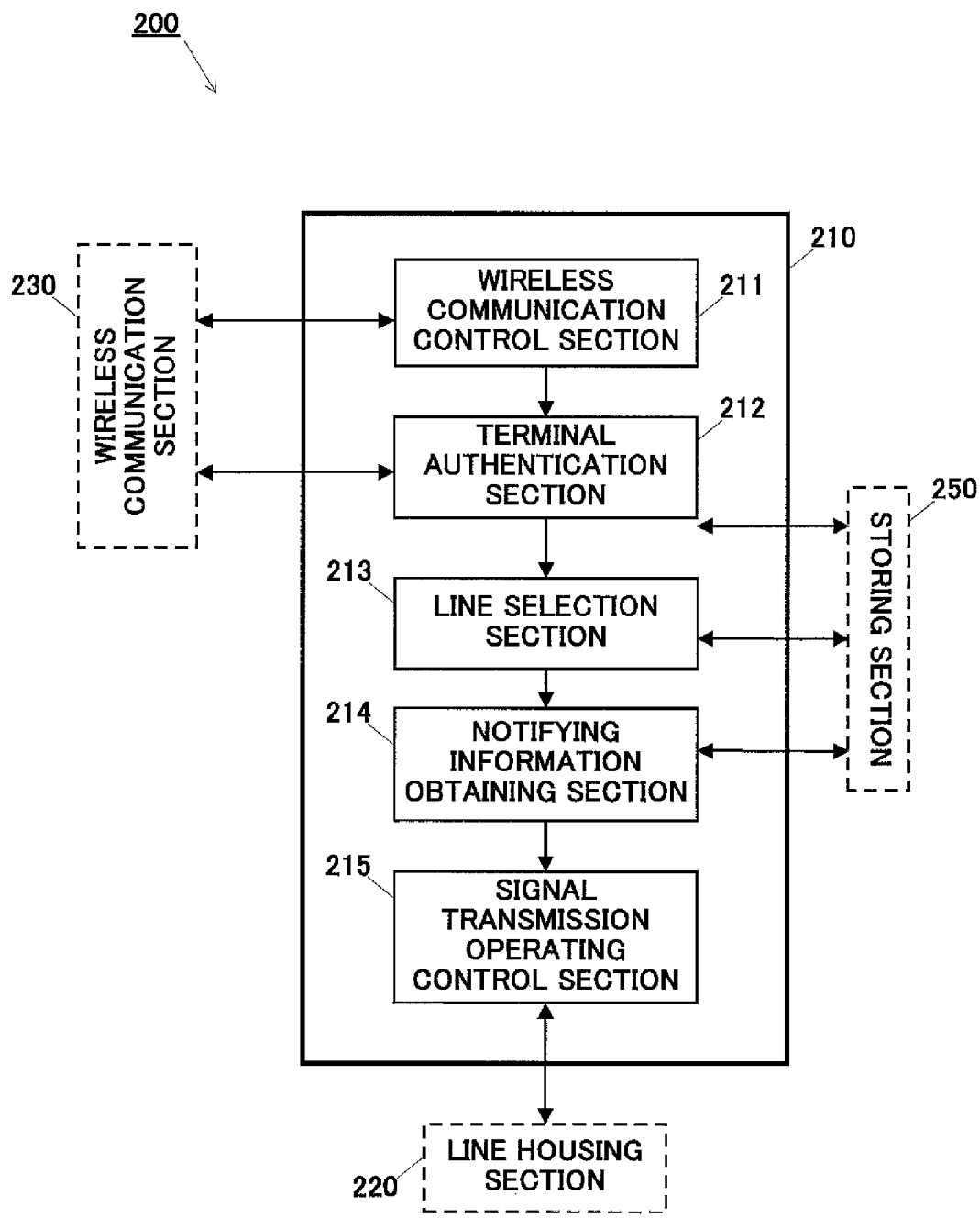
FIG. 7 is a functional block diagram showing functions realized by the control section shown in FIG. 5.

More specifically, when signal transmission operations of the FMC are performed by the access from the mobile telecommunication terminal 100, the functions as shown in the functional block diagram in FIG. 7 can be achieved by the execution of the program stored in the program storing region 253 by the control section 210. The control section 210, as shown in FIG. 7, includes a wireless communication control section 211, a terminal authentication section 212, a line selection section 213, a notifying information obtaining section 214, a signal transmission operating control section 215, or the like.

The wireless communication control section 211 performs an operation of wireless communication (non-cellular communication) with the mobile telecommunication terminal 100 by controlling the wireless communication section 230.

The terminal authentication section 212 determines whether or not the mobile telecommunication terminal 100 that has wirelessly accessed the communication device 200 is the mobile telecommunication terminal 100 that can use the FMC service using the communication device 200. More specifically, the terminal authentication section 212 determines whether or not the mobile telecommunication terminal 100 is a terminal that can use the FMC service by making a reference to identification information to be transmitted by the mobile telecommunication terminal 100 at a time of its access and to information stored in the line information storing region 251 and the terminal information storing region 252.

The line selection section 213 selects a line to be used for the FMC by the mobile telecommunication terminal 100 having accessed the communication device 200. More specifically, the line selection section 213 selects the fixed telephone line 21 that can be used for the FMC service by the mobile telecommunication terminal 100 having accessed the communication device 200, from lines being housed in the line housing section 220 based on information stored in the line information storing region 251 or terminal information storing region 252.

The notifying information obtaining section 214 obtains notifying information to be notified to a signal receiver when the mobile telecommunication terminal 100 transmits a signal for the FMC. Here, the notifying information is a telephone number of a transmitter of the signal. When notifying information is designated by the mobile telecommunication terminal 100, the notifying information obtaining section 214 obtains the designated telephone number as the notifying information. On the other hand, when notifying information is not designated by the mobile telecommunication terminal 100, the notifying information obtaining section 214 obtains a telephone number of a line selected by the line selection section 213 as the notifying information.

The signal transmission operating control section 215 controls the line housing section 220 and performs a signal transmission operation for the FMC by the mobile telecommunication terminal 100 having accessed to the communication device 200. More specifically, the signal transmission operating control section 215 originates a call through the fixed telephone line 21 (fixed telephone network 20) designated as an FMC line to a signal receiver designated by the mobile telecommunication terminal 100 by performing an operation for specified call control. The signal transmission operating control section 215 is allowed to notify the notifying information to a signal receiver by making the notifying information obtained by the notifying information obtaining section 214 be contained in the control information for call control.

In the embodiments, each function shown in FIG. 7 can be logically implemented by the execution of programs by the control section 210, however, each function described above may be implemented by hardware such as an ASIC.

Moreover, each function described above is an element required to make the fixed telephone set or access point device function as the mobile communication device of the present invention, however, other functions related to the basic and additional functions required as the fixed telephone set or access point device may be provided as necessary.

Operations of the communication system 1 having the configurations described above are described below. Here, an example of operations is explained in which the mobile telecommunication terminal 100 carries out FMC signal transmission via the communication 200.

First Embodiment

Figure 8:
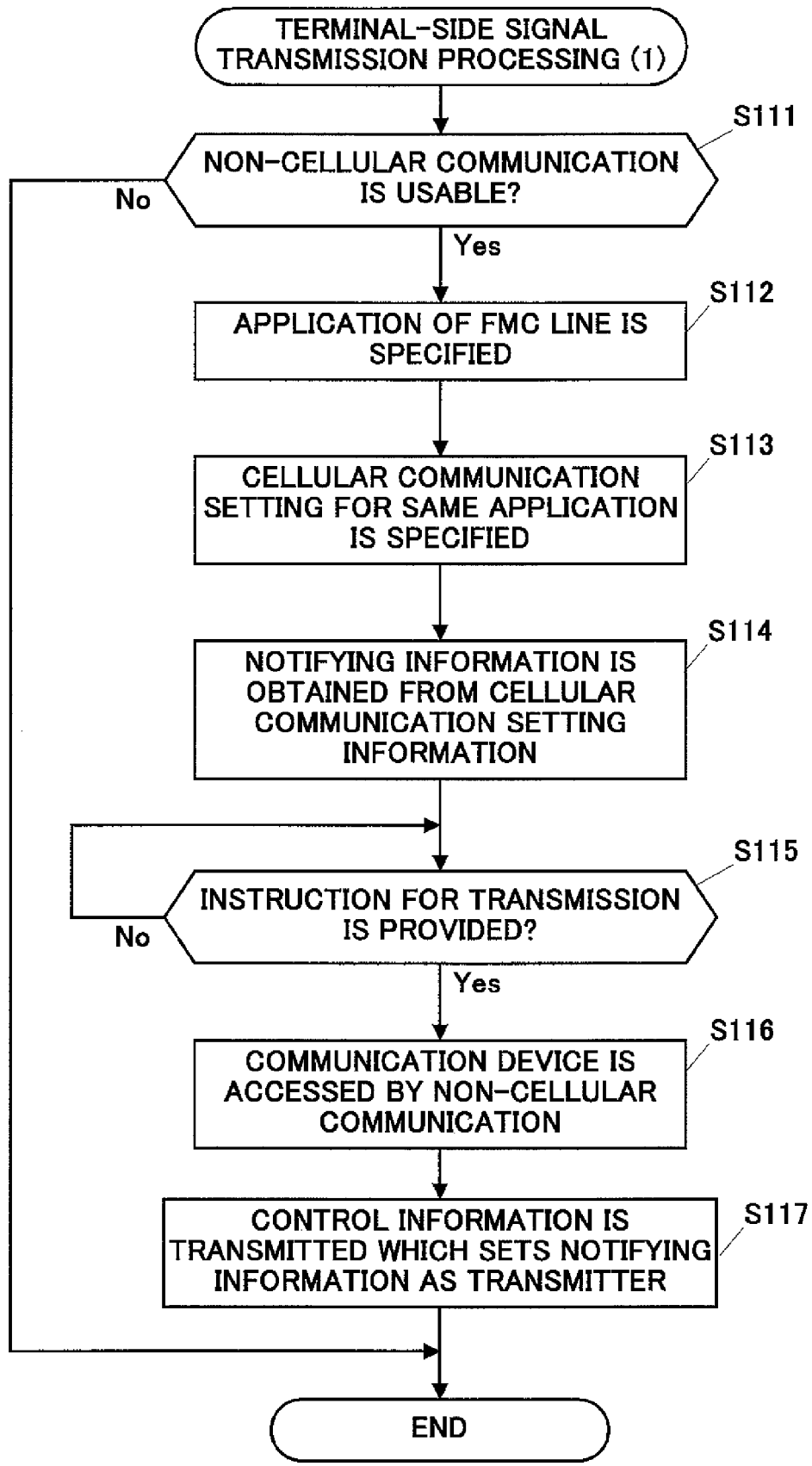
FIG. 8 is a flowchart explaining "terminal-side signal transmission processing (1)" according to the first embodiment of the present invention.

First, "terminal-side signal transmission processing (1)" to be performed when the mobile telecommunication terminal 100 inputs a telephone number of a signal receiver for transmission is described by referring to the flowchart shown in FIG. 8. The terminal-side signal transmission processing (1) is started at an opportunity when a signal transmission button making up the operating section 141 is operated.

When the signal transmission button is operated, a signal showing that the signal transmission button has been operated is inputted from the operating section 141 to the control section 110 and the signal is received by the interface control section 111. The interface control section 111, when determining that the signal transmission button has been operated based on the input signal fed from the operating section 141, makes an inquiry to the usable line determining section 112 about whether or not non-cellular communication is usable.

In response to the inquiry from the interface control section 111, the usable line determining section 112 controls the non-cellular communication section 130 to determine whether or not the non-cellular communication is usable (Step S111). Specifically, the usable line determining section 112 determines whether or not the mobile telecommunication terminal 100 is within a communication zone with the communication device 200 used for the FMC service based on a wireless communication operation by the non-cellular communication section 130 in order to determine whether or not the non-cellular communication is usable.

Here, if it is determined that the mobile telecommunication terminal 100 is not within a communication zone with the communication device 200 and that the non-cellular communication is not usable (Step S111: No), the terminal-side signal transmission processing (1) is terminated. In this case, by separate execution of cellular communication by operations of the cellular communication section 120, a signal transmission operation for cellular communication is performed.

On the other hand, if it is determined that the mobile telecommunication terminal 100 is within a communication zone with the communication device 200 and that the non-cellular communication is usable (Step S111: Yes), the usable line determining section 112 notifies the determination to the use line selecting section 113. The use line selecting section 113, in response to the notification fed from the usable line determining section 112, accesses the non-cellular communication setting information storing region 162 and selects the line set in the non-cellular communication setting information storing region 162 as a line to be used for the FMC service (FMC line) to notify the selection to the notifying information obtaining section 114.

The notifying information obtaining section 114, in response to the notification from the use line selecting section 113, accesses the non-cellular communication setting information storing region 162 to specify the application set by the selected line (FMC line) (Step S112). In the embodiment, as shown in FIG. 3B, as an application of the FMC line, "business" is set.

Next, the notifying information obtaining section 114 accesses the cellular communication setting information storing region 161 to specify the cellular communication setting in which the application being the same as specified at Step S112 is set (Step S113). As described above, as the application of the FMC line, "business" is set and, therefore, the notifying information obtaining section 114 specifies the setting in which "business" is set as application out of the cellular communication setting (in the embodiment, UIM1 and UIM2) being stored in the cellular communication setting information storing region 161. In the embodiment, as shown in FIG. 3A, "business" is set as the application for the UIM1. Therefore, the notifying information obtaining section 114 specifies the UIM1 as the cellular communication setting for the application being the same as set to the FMC line.

The notifying information obtaining section 114 obtains a telephone number being stored in the cellular communication setting specified at Step S113 (Step S114) as notifying information.

Moreover, the notifying information obtaining section 114 notifies the obtained notifying information and a line to be used to the signal transmission operating control section 115 and instructs the notifying information to be added at a time of signal transmission.

Here, the processing includes steps of inputting a telephone number and transmitting the telephone number. Therefore, a user of the mobile telecommunication terminal 100 manipulates a numeral key making up the operating section 141 to input a telephone number of a targeted signal receiver and operates a key to provide an instruction for transmission. When an input signal corresponding to the above operations is inputted from the operating section 141 to the control section 110, the interface control section 111 determines that an instruction for the transmission is provided (Step S115: Yes) and transmits the inputted telephone number and notifies the signal transmission operating control section 115 of the transmission and provides an instruction for transmission to the telephone number.

The signal transmission operating control section 115 performs a signal transmission operation at an opportunity when the instruction for the transmission is provided by the interface control section 111. At this point, the signal transmission operating control section 115 controls either of the cellular communication section 120 or the non-cellular communication section 130 depending on the line notified by the notifying information obtaining section 114 and performs the signal transmission operation. According to the first embodiment, it is determined in Step S111 that communication with the communication device 200 is possible and it is determined in Step S113 that the FMC line is selected and, therefore, the signal transmission operating control section 115 controls the non-cellular communication section 130 to access the communication device 200 (Step S116).

In this case, the signal transmission operating control section 115 establishes communications with the communication device 200 by transmitting authentication information stored in the non-cellular communication setting information storing region 162 to the communication device 200 based on procedures specified when the FMC service is provided.

Then, the signal transmission operating control section 115 makes a request asking the transmission addressed to the telephone number notified by the interface control section 111 of the communication device 200, generates control information which makes notifying information obtained by the notifying information obtaining section 114 showing a signal transmitter, then transmits the notifying information to the communication device 200 (Step S117) and terminates the "terminal-side signal transmission processing (1)".

Figure 9:
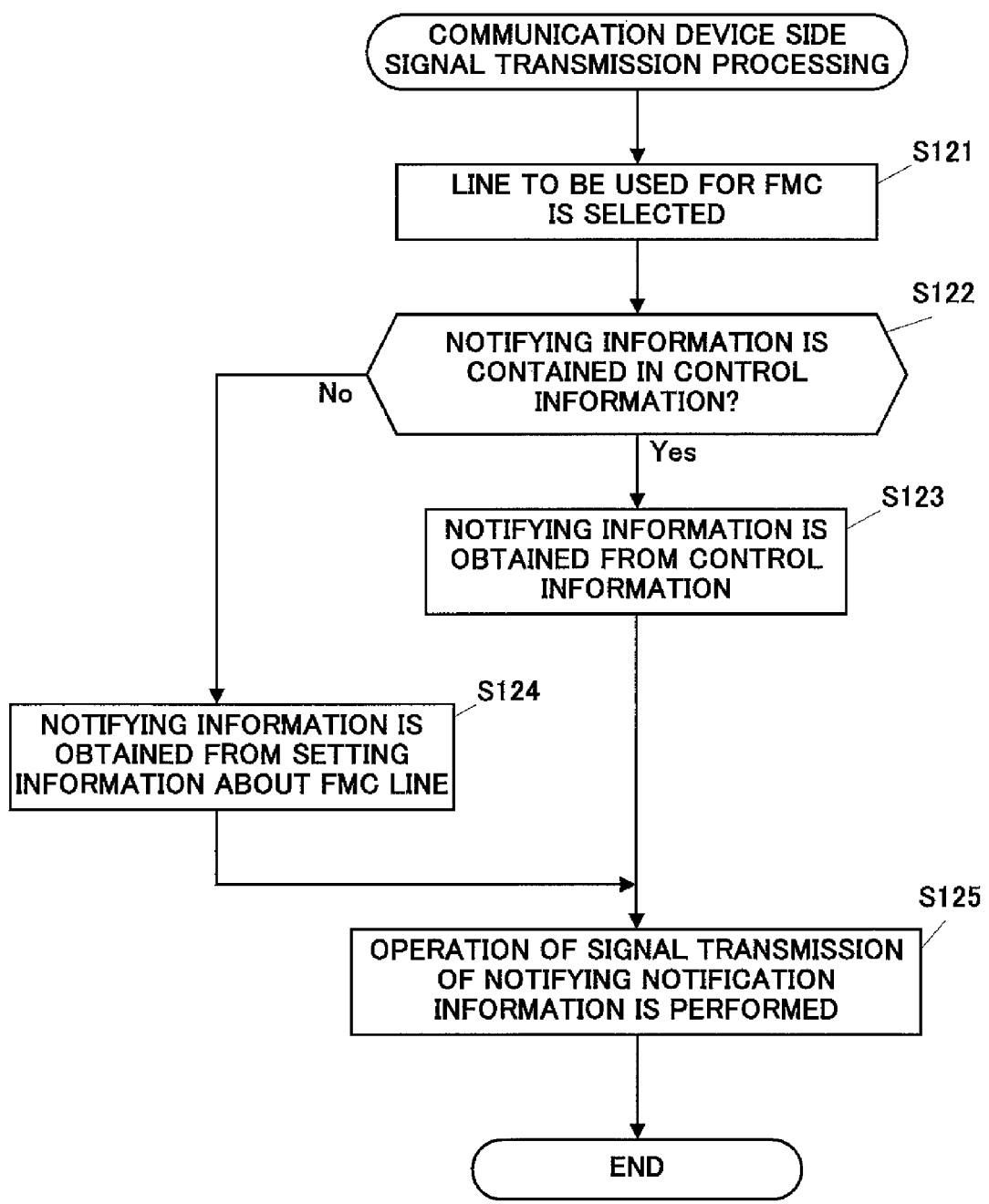
FIG. 9 is a flowchart explaining "communication device side signal transmission processing" of each of the embodiments of the present invention.

Thus, "communication device side signal transmission processing" to be carried out by the communication device 200 when control information is transmitted from the mobile telecommunication terminal 100 will be described by referring to a flowchart shown in FIG. 9. The communication device side signal transmission processing is started when communication is established with the mobile telecommunication terminal 100 having accessed the communication device 200 at Step S116 shown in FIG. 8.

More specifically, the communication device 200 performs wireless communication (non-cellular communication) with the mobile telecommunication terminal 100 by operations of the wireless communication control section 211. The communication device 200 establishes the communication with the mobile telecommunication terminal 100 by the authentication using the terminal authenticating section 212 by making a reference between authentication information to be fed from the mobile telecommunication terminal 100 and terminal information stored in the terminal information storing region 252.

Then, the terminal authentication section 212 obtains control information transmitted by the mobile telecommunication terminal 100 to notify the obtained information of the line selection section 213. The control information transmitted from the mobile telecommunication terminal 100 contains not only a telephone number of a signal receiver but also notifying information to be notified to the signal transmitter.

The line selection section 213 accesses the line information storing region 251 and terminal information storing region 252 according to the notification from the terminal authentication section 212 to select a line to be used for the FMC service (Step S121). Moreover, the line selection section 213 notifies the selected line information together with control information obtained from the mobile telecommunication terminal 100 of the notifying information obtaining section 214.

The notifying information obtaining section 214 determines whether or not notifying information designated by the mobile telecommunication terminal 100 is contained in the control information notified by the line selection section 213 (Step S122). Here, when the notifying information is contained in the control information fed from the mobile telecommunication terminal 100 (Step S122: Yes), the notifying information obtaining section 214 obtains notifying information to be attached at a time of signal transmission from the control information fed from the mobile telecommunication terminal 100 (Step S123).

On the other hand, when notifying information is not contained in the control information fed from the mobile telecommunication terminal 100 (Step S122: No), the notifying information obtaining section 214 accesses the line information storing region 251 to obtain a telephone number of the FMC line, as notifying information, from the setting information about the FMC line selected by the line selection section 213 (Step S124).

Then, the notifying information obtaining section 214 provides an instruction for transmission using the FMC line by notifying a telephone number of a signal receiver indicated by the control information fed from the mobile telecommunication terminal 100, a telephone number of a line selected by the line selection section 213, and notifying information obtained at the Step S123 or Step S124 to the signal transmission operating control section 215.

The signal transmission operating control section 215, in response to the instruction provided by the notifying information obtaining section 214, controls the line housing section 220 and carries out signal transmission by using the selected FMC line to the telephone number of the designated signal receiver. More specifically, the signal transmission operating control section 215 notifies the telephone number to the party to be communicated with (Step S125) by performing the operation of signal transmission designating the telephone number indicated by the notifying information notified from the notifying information obtaining section 214 as a telephone number of the transmitter and terminates the "communication device side signal transmission processing".

Now, in the "terminal-side signal transmission processing (1)" described above, a telephone number (in the embodiment, telephone number of the UIM1) of the mobile telecommunication terminal 100 having the same application as set to the FMC line is automatically obtained as the notifying information. Therefore, in the "communication device side signal transmission processing", not the telephone number of the FMC line but the telephone number of the mobile telecommunication terminal 100 is notified as a telephone number of the transmitter to the party on the other end of the phone.

Thus, according to the embodiment, when the mobile telecommunication terminal 100 can perform the communication via the fixed telephone network 20, not the telephone number of a fixed telephone line but the telephone number of the mobile telecommunication terminal 100 is notified as a telephone number of a transmitter to a signal receiver.

By storing, in advance, setting information of a plurality of lines to be used selectively depending on the application in the mobile telecommunication terminal 100, the telephone number of the mobile telecommunication terminal 100 having the same application as set when the fixed telephone network 20 is used, is automatically set as a transmitter telephone number. Thus, when a signal is transmitted from the mobile telecommunication terminal 100 in, for example, an office, by using the telephone number having already set in the mobile telecommunication terminal 100 for business use, the signal transmission can be carried out via the fixed telephone network 20. Therefore, both conveniences that a party of the other end of the phone can recognize a transmitter at an individual level and cost effectiveness provided by the use of a fixed telephone can be achieved by a user without needs for complicated manipulation.

Incidentally, in the above first embodiment, the mobile telecommunication terminal 100 automatically selects a telephone number of a transmitter, however, a user of the mobile telecommunication terminal 100 may be allowed to select a desired transmitter telephone number by displaying a specified telephone number on a screen of the displaying section 142.

Second Embodiment

Figure 10:
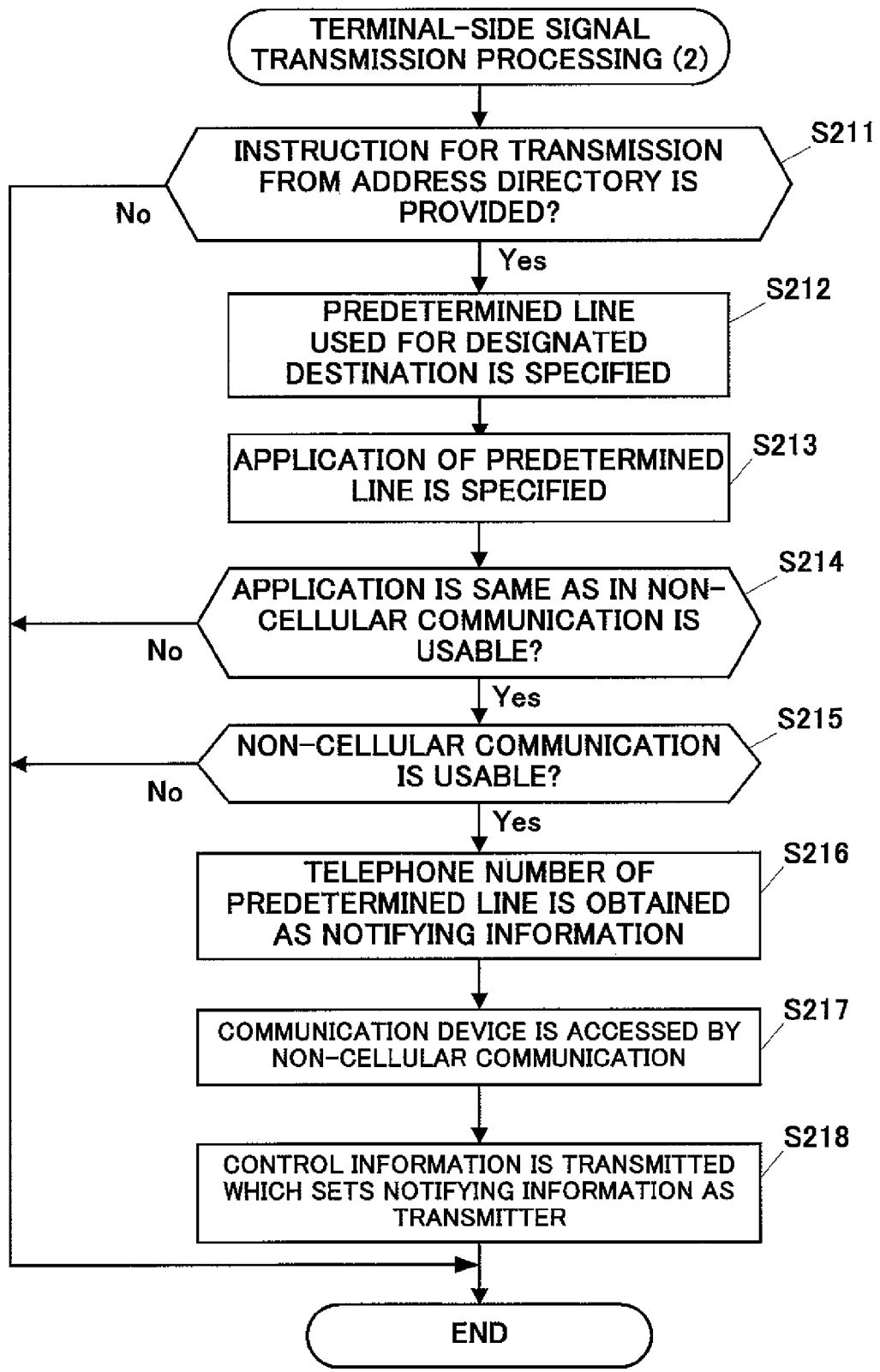
FIG. 10 is a flowchart explaining "terminal-side signal transmission processing (2)" according to the second embodiment of the present invention.

"The terminal-side signal transmission processing (2)" to be performed by the mobile telecommunication terminal 100 when signal transmission is carried out by using an address directory function of the mobile telecommunication terminal 100 is described by referring to the flow chart in FIG. 10. The terminal-side signal transmission processing (2) is started at an opportunity when a user of the mobile telecommunication terminal 100 operates the operating section 141 and provides an instruction for performing the address directory function of the mobile telecommunication terminal 100.

The interface control section 111 realizes the address directory function when a signal is inputted from the operating section 141 to the control section 110 in a manner to correspond to specified operation of a key to be used to perform the address directory function, by generating an address directory image based on address information being stored in the address information storing region 163 to display the image on the displaying section 142. More specifically, on the displaying section 142 is displayed an address directory image in which a table from which names being registered in the address information storing region 163 is able to be selected is displayed.

At this point, a user of the mobile telecommunication terminal 100 manipulates, for example, a cross key or the like to select a desired name as a signal receiver from the table and operates a key used to provide an instruction for transmission to a selected name. When a signal corresponding to the operations as described above is inputted from the operating section 141 to the control section 110, the instruction for signal transmission is determined by the interface control section 111 as being inputted from the address directory (Step S211: Yes). In this case, the interface control section 111 makes inquiries to the usable line determining section 112 about whether or not the line being set to a signal receiver designated from the address directory is usable and notifies a designated signal receiver to the use line selecting section 113.

In response to an inquiry from the interface control section 111, the usable line determining section 112 accesses the address information storing region 163 and specifies communication setting corresponding to a transmitter designated from the address directory, that is, a line (hereinafter, "predetermined line") to be used for transmission to the signal receiver (Step S212). For example, in the case where the name A is designated as a signal receiver from the address information shown in FIG. 3C, the usable line determining section 112 specifies an attribute information "UIM1" set corresponding to the name A as the predetermined line.

Next, the usable line determining section 112 accesses the cellular communication setting information storing region 161 and non-cellular communication setting information storing region 162 and finds setting information about the predetermined line that has been set. For example, if the UIM1 is specified at the Step S212, the usable line determining section 112 obtains, as a retrieving result, setting of the UIM1 being stored in the cellular communication setting information storing region 161.

Then, the usable line determining section 112 specifies application being set in the specified predetermined line by making a reference to the setting information that has been found (Step S213). Moreover, the usable line determining section 112 accesses the non-cellular communication setting information storing region 162 and determines whether or not the application being stored in the non-cellular communication setting is the same as the application of the predetermined line specified at the Step S213 (Step S214).

Here, if it is determined that the application set to the predetermined line is not the same as set in the none-cellular communication (Step S214: No), the terminal-side signal transmission processing (2) is terminated. In this case, signal transmission is carried out by the cellular communication section 120 by cellular communication based on cellular communication setting made for the specified predetermined line.

On the other hand, if it is determined that the application set in the predetermined line is the same as the application set in the non-cellular communication (Step S214: Yes), the usable line determining section 112 controls the non-cellular communication section 130 to determine whether or not the non-cellular communication is usable (Step S215).

Here, when it is determined that the non-cellular communication with the communication device 200 is not usable (Step S215: No), the terminal-side signal transmission processing (2) is terminated. In this case, the signal transmission is carried out by cellular communication using the cellular communication section 120.

On the other hand, when it is determined that the non-cellular communication is usable (Step S215: Yes), the usable line determining section 112 notifies that the predetermined line specified by Step S213 and the non-cellular communication are usable to the use line selecting section 113. Then, the use line selecting section 113 selects the non-cellular communication set in the non-cellular communication setting information storing region 162 as a use line and obtains a telephone number of a signal receiver notified from the interface control section 111 from the address information storing region 163.

The use line selecting section 113 notifies a signal receiver telephone number obtained from the address information storing region 163, specified predetermined line, and line to be used to the notifying information obtaining section 114. The notifying information obtaining section 114, when communication is performed by non-cellular communication, obtains the telephone number of the predetermined line notified from the use line selecting section 113 as notifying information (Step S216).

Next, the notifying information obtaining section 114 makes a request asking signal transmission by the non-cellular communication to a transmitter telephone number and also asking notification of notifying information obtained at the Step 216 to a signal receiver to the signal transmission operating control section 115. In response to the notification fed from the notifying information obtaining section 114, the signal transmission operating control section 115 controls the non-cellular communication section 130 to access the communication device 200 (Step S217).

In this case, the signal transmission operating control section 115 establishes communication with the communication device 200 by transmitting authenticating information stored in the non-cellular communication setting information storing region 162 based on a procedure designated when the FMC service is provided.

Then, the signal transmission operating control section 115 makes a request asking the communication device 200 to transmit the signal to a specified signal receiver telephone number and generates control information which sets the notifying information obtained by the notifying information obtaining section 114 as notifying information showing a signal receiver and transmits the generated information to the communication device 200 (Step S218) and then terminates the terminal-side signal transmission processing (2).

Thus, when the control information is transmitted from the mobile telecommunication terminal 100 to the communication device 200, "the communication device side signal transmission processing" shown as the example in the first embodiment is performed in the communication device 200 and signal transmission is started to notify the notifying information contained in the control information fed from the mobile telecommunication terminal 100 to the signal receiver.

As described above, according to the second embodiment, when the signal transmission is carried out by selecting a signal receiver using the address directory function of the mobile telecommunication terminal 100, if the application set to the signal receiver is the same as the application set for the non-cellular communication, the non-cellular communication is selected, with priority, as a line to be used and not a telephone number non-cellular communication of but a telephone number of the the mobile telecommunication terminal 100 is notified to the signal receiver.

Moreover, in the above second embodiment, the mobile telecommunication terminal 100 automatically selects a telephone number of a transmitter, however, a user of the mobile telecommunication terminal 100 may be allowed to select a desired transmitter telephone number by displaying a specified telephone number on a screen of the displaying section 142.

Incidentally, in the above second embodiment, address information is stored in the address information storing region 163 and attribute information is stored for every address information, however, address information may be stored for every cellular communication setting. In this case, a telephone number to be notified when the telephone number of a party on the other end of the phone is selected from the address directory and is transmitted from the fixed telephone line 21 may be obtained, as notifying information, from information stored in the address information storing region 163 which is preset so that, for example, "the telephone number is selected according to the setting of the address directory", "the telephone number is selected according to the setting of a corresponding cellular communication", or "the telephone number is selected according to the setting of a fixed telephone".

Moreover, when, as attribute information of selected address information, "UIM3" corresponding to the fixed telephone line 21 is registered, the telephone number of the fixed telephone line 21 stored in the non-cellular communication setting information storing region 162 is obtained as notifying information or by making notifying information not be contained in the control information to the communication device 200, the telephone number notified by call origination from the communication device 200 is used as the telephone number of the fixed telephone line 21. This prevents indiscriminate notification of the telephone number of the mobile telecommunication terminal and, therefore, to a party who knows a telephone number of a fixed telephone but does not know the telephone number for mobile telecommunication, not a telephone number of a mobile telecommunication terminal but a telephone number of a fixed telephone may be notified.

Third Embodiment

In each of the above embodiments, the example is shown in which, as setting information of cellular communication, either of business application or private application is set, however, a plurality of pieces of cellular setting information having the same application may be stored in the cellular communication setting information storing region 161. Moreover, by the addition of the UIM card, a plurality of pieces of setting information for the non-cellular communication may be stored in the non-cellular communication setting information storing region 162.

In this case, notifying information may be obtained by predetermining a telephone number of a signal receiver, as a condition stored, in advance, in the storing section 160, to be notified when signal transmission is carried out for the FMC service. The mobile communication terminal 100 may acquire communication information in accordance with the set condition. For example, in the case where a user of the mobile telecommunication terminal 100 is doing the work in which a working place or belonging position changes depending on a day of the week or a time zone, condition setting may be made by storing day and time information showing the day of the week or time zone using each setting out of a plurality of cellular communication settings and a plurality of non-cellular communication settings.

Then, the mobile telecommunication terminal 100, when the non-cellular communication is usable at day and time when signal transmission is instructed, may use a telephone number for cellular communication setting corresponding to the day and time, as a transmitter telephone number.

By making such condition setting, even if there is a plurality of settings for the same application, a proper transmitter telephone number can be notified to a signal receiver. Moreover, such condition setting is not limited to day and time and any condition may be employed.

As described above, by applying the present invention to the embodiments as described above, when signal transmission is carried out from a mobile telecommunication terminal via a fixed telephone line, the telephone number of the mobile telecommunication terminal can be notified. This enables the achievement of both convenience of identifying a transmitter at an individual level and cost effectiveness of using a fixed telephone line at the same time.

In this case, if a mobile telecommunication terminal to be used is a dual-mode terminal that enables selective use of a plurality of telephone numbers corresponding to applications, a telephone number having the same application as set for the usable fixed telephone network can be automatically selected and notified. Therefore, if a telephone number is used properly depending on applications, it is made possible to notify an appropriate telephone number.

Moreover, by registering a desired communication setting information (telephone number) as address information being stored in an address directory of the mobile telecommunication terminal, even when signal transmission via a fixed telephone network is carried out using the address directory, a telephone number for the registered communication can be automatically selected and notified as a transmitter telephone number. This enables the notification of proper telephone number even in the case where a telephone number is used depending on a party on the other end of the phone.

In this case, by setting, in advance, the setting information which determines the telephone number to be notified when signal transmission is carried out using the address directory whether the telephone number is selected according to the setting of the address directory, the telephone number is selected according to the setting of a corresponding communication, or the telephone number is selected according to the setting of a fixed telephone, and the telephone number requested by a user of the mobile telecommunication terminal can be notified.

Also, in the case where both a plurality of cellular communication settings and a plurality of non-cellular communication settings are made for the mobile telecommunication terminal, by making a condition setting for a telephone number requested to be notified based on, for example, day and time, even when a plurality of telephone numbers usable by the mobile telecommunication terminal is used depending on applications, a proper telephone number can be notified.

Also, for each of the settings in the cellular communication and the settings in the non-cellular communication, a storage medium being attachable and detachable to and from the mobile telecommunication terminal such as an UIM card may be used. Therefore, it is made possible to easily expand and change a transmitter telephone number to be notified on the fixed telephone line and to notify the telephone number properly.

Also, the communication device to carry out signal transmission from a mobile telecommunication terminal via a fixed telephone line can be realized by adding configurations which performs communication with the mobile telecommunication terminal to a device such as wireless LAN access point which establishes connection with a fixed telephone line as a main function and additionally by adding configurations which establishes connection with a fixed telephone line to a device which performs wireless communication with a mobile telecommunication terminal. That is, by adding functions to a fixed telephone set or wireless access point, effects of the present invention can be obtained and a communication device having a configuration matching with an application and use place can be employed.

The above embodiments are examples and an application range of the present invention is not limited to these embodiments. That is, various applications are possible and every embodiment is within a range of the present invention.

For example, in the above embodiments, an application to be applied when a mobile telecommunication terminal 100 performs communication (FMC) via a fixed telephone network 20 is set as business, however, any application can be applied to the cellular communication setting and non-cellular communication setting. For example, if a fixed telephone line is used in a general family, a telephone number of each mobile telecommunication terminal that each family member has can be notified to a party on the other end of the phone.

Incidentally, in the above embodiments, the example is shown in which a plurality of pieces of cellular communication setting is stored in the mobile telecommunication terminal 100 in order to use for business application and private application, however, it is not necessary that the number of cellular communication setting is plural and may be only one. All that is needed is that in a communication device to carry out signal transmission by the non-cellular communication are registered one or more telephone numbers being different from a telephone number ordinarily used.

Also, the place where the communication device enabling the communication through a fixed telephone line by a mobile telecommunication terminal is installed is not limited to an office or home. For example, when a telephone placed at each room of a lodging facility is used as a communication device of the present invention, by the use of the mobile telecommunication device of the present invention by a customer of the lodging facility, the customer can carry out signal transmission from his/her own mobile telecommunication terminal through the fixed telephone network and also can notify a telephone number of his/her mobile telecommunication terminal to a signal receiver. Additionally, by using various communication devices corresponding to non-cellular communication functions of a mobile telecommunication terminal as the communication device of the present invention, in various places where a fixed telephone network is usable, signal transmission is made possible by notifying the telephone number of a mobile telecommunication terminal.

Also, in the above embodiments, a telephone number to be used in cellular communication is notified to a signal receiver, however, so long as identification information by a mobile telecommunication or its user can be identified, the notifying information is not limited to a telephone number and any information can be used for identification. For example, an e-mail address, user name, or the like may be used as notifying information.

Incidentally, the above mobile telecommunication terminal 100 can be provided as a mobile telecommunication terminal already provided with functions to realize the present invention and, additionally, by installing a program, any existing mobile telecommunication terminal not provided with above functions can be used as the mobile telecommunication terminal of the present invention.

In this case, by installing a program being the same as the program which has realized each function of the above mobile telecommunication terminal 100, on a mobile telecommunication terminal having, at least, a wireless communication function being different from cellular communication and by making a computer (CPU or the like) controlling the mobile telecommunication terminal execute the program on the mobile telecommunication terminal, the mobile telecommunication terminal is made to function as the mobile telecommunication terminal of the present invention.

Moreover, similarly, by installing a program, an existing communication device can be made to function as the communication device of the present invention. That is, by installing the program being the same as the program which has realized each function of the above communication device 200 on the communication device at least being able to access a fixed telephone network and to perform wireless communication with a mobile telecommunication and by making a computer (CPU or the like) execute the program, the communication device is made to function as the communication device of the present invention.

Any method of applying such programs as described above may be employed. That is, by storing the above program in a storage medium such as a memory card, USB (Universal Serial Bus) memory, FD (Flexible Disk), MO (Magneto-Optical) disk, CD (Compact Disk), DVD (Digital Versatile Disk), HD (High-Definition)-DVD, BD (Blue-ray Disk), or the like, the program is distributed to be used in any device and, additionally, the program may be provided via the communication medium such as the Internet.

Specifically, by uploading the program on the BBS (Bulletin Board System), the program is distributed via this communication medium. Moreover, a carrier wave may be modified by a signal shown by the program and the obtained modified wave is transmitted and a device having received the modified wave demodulates the modulated wave to reconstruct the program.

Then, by starting the program and executing the program under control of an OS in the same method by other applications to be executed, the above processing can be performed.

Additionally, if the OS partially participates in the processing or if the OS makes up part of one component of the present invention, a program excluding the part of the component may be stored in the storage medium. In this case, in the present invention, a program to implement various functions or steps to be executed by a computer is stored in the storage medium.

Various embodiments and changes may be made thereonto without departing from the broad spirit and scope of the invention. The above-mentioned embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-247845 filed on Sep. 25, 2007, and including specification, claims, drawings and summary. The disclosure of the above Japanese Patent Application is incorporated herein by reference in its entirety.

What is claimed is:

1. A mobile telecommunication terminal for performing mobile telecommunication by wireless access to a mobile telecommunication line and wireless communication using a communication method being different from the wireless access, comprising:
   a communicability determining section which determines whether or not communication is made possible, by the wireless communication, with a communication device to which a non-mobile telecommunication line being different from the mobile telecommunication line is connected;
   a signal transmission instructing section which, when it is determined by the communicability determining section that communication with a communication device by the wireless communication is made possible, accesses wirelessly the communication device and instructs the communication device to carry out signal transmission enabling identification of the mobile telecommunication terminal through the non-mobile telecommunication line;
   a communication setting information storing section which stores mobile telecommunication setting information containing identifying information to be used in the mobile telecommunication; and
   an identifying information obtaining section which obtains the identifying information from the mobile telecommunication setting information when it is determined by the communicability determining section that communication with the communication device is made possible,
   wherein the signal transmission instructing section instructs the communication device to carry out signal transmission in order to notify a signal receiver, via the non-mobile telecommunication line, of the identifying information obtained by the identifying information obtaining section.

2. The mobile telecommunication terminal according to claim 1, wherein
   the communication setting information storing sections further store the mobile telecommunication setting information containing the identifying information and information about applications for the mobile telecommunication and non-mobile telecommunication setting information containing information about applications for the non-mobile telecommunication through the non-mobile telecommunication line, wherein
   the identifying information obtaining section obtains the identifying information from the mobile telecommunication setting information having a same application as the application of the non-mobile communication contained in the non-mobile telecommunication setting information.

3. The mobile telecommunication terminal according to claim 1, further comprising:
   an address information storing section which stores address information of a signal receiver and communication type to be used for signal transmission to each signal receiver in a manner to be associated with one another, wherein
   the identifying information storing section obtains the identifying information from the setting information about communication type associated with address information designated as a signal receiver.

4. The mobile telecommunication terminal according to claim 3, wherein
   the address information storing section further stores notification specifying information to specify which information is identifying information to be notified to a signal receiver and, wherein
   the identifying information obtaining section obtains the identifying information based on notification specifying information being stored in the address information storing section.

5. The mobile telecommunication terminal according to claim 1, further comprising:
   a condition setting information storing section to store condition setting information for every usable communication, wherein
   the identifying information obtaining section obtains the identifying information from the setting information about communication corresponding to a condition for the condition setting.

6. The mobile telecommunication terminal according to claim 1, wherein
   the communication setting information storing sections comprise a storage medium attachable and detachable to and from the mobile telecommunication terminal.

7. A communication system comprising:
   the mobile telecommunication terminal stated in claim 1; and
   the communication device, wherein
   the communication device comprises;
   a signal transmission section, in response to receipt of an instruction from the signal transmission instructing section, carries out signal transmission enabling the identification of the mobile telecommunication terminal via the non-telecommunication line.

8. The communication system according to claim 7, wherein the mobile telecommunication terminal comprises;
   a communication setting information storing section to store mobile telecommunication setting information containing identifying information to be used for the mobile telecommunication, and
   an identifying information obtaining section to obtain the identifying information from the mobile telecommunication setting information when it is determined by the communicability determining section that communication with the communication device is made possible, and wherein
   the signal transmission section carries out signal transmission to notify identifying information obtained by the identifying information obtaining section via the non-mobile telecommunication line to a signal receiver.

9. The communication system according to claim 8, wherein
   the signal transmission instructing section transmits control information for transmission using the non-mobile telecommunication line containing the identifying information obtained by the identifying information obtaining section to the communication device and, wherein
   the communication device further comprises;
   a control information obtaining section to obtain the control information to be transmitted from the signal transmission instructing section and
   an identifying information determining section to determine whether or not the identifying information is contained in the control information obtained by the control information obtaining section, and wherein the signal transmission section carries out signal transmission to notify the identifying information to a signal receiver based on the control information through the non-telecommunication line in a case where it is determined by the identifying information determining section that the identifying information is contained in the control information.

10. A computer readable storage medium for storing a program making a computer which controls a mobile telecommunication terminal for performing mobile telecommunication by wireless access to a mobile telecommunication line and wireless communication using a communication method being different from the wireless access execute:

a communicability determining procedure of determining whether or not communication is made possible, by the wireless communication, with a communication device to which a non-mobile telecommunication line different from the mobile telecommunication line is connected;

a signal transmission instructing procedure of, when it is determined by the communicability determining procedure that communication with a communication device by the wireless communication is made possible, accessing wirelessly the communication device and instructing the communication device to carry out signal transmission enabling the identification of the mobile telecommunication terminal through the non-mobile telecommunication line;

a communication setting information procedure for storing mobile telecommunication setting information containing identifying information to be used in the mobile telecommunication; and an identifying information obtaining procedure that obtains the identifying information from the mobile telecommunication setting information when it is determined by the communicability determining section that communication with the communication device is made possible, wherein the signal transmission instructing procedure instructs the communication device to carry out signal transmission in order to notify a signal receiver, via the non-mobile telecommunication line, of the identifying information obtained by the identifying information obtaining section through the non-mobile telecommunication line to a signal receiver.

* * * * *